United States Patent [19]

Hvalsbråten

[11] Patent Number: 4,669,985
[45] Date of Patent: Jun. 2, 1987

[54] AID FOR USE IN INSTRUCTION WITHIN THE HAIRDRESSER PROFESSION

[76] Inventor: Lise L. Hvalsbråten, Bergerudvn. 9, 2008 Fjerdingby, Norway

[21] Appl. No.: 727,329

[22] PCT Filed: Aug. 21, 1984

[86] PCT No.: PCT/NO84/00031
§ 371 Date: Apr. 23, 1985
§ 102(e) Date: Apr. 23, 1985

[87] PCT Pub. No.: WO85/01142
PCT Pub. Date: Mar. 14, 1985

[30] Foreign Application Priority Data

Aug. 29, 1983 [NO] Norway ................... 833089

[51] Int. Cl.⁴ ................................ G09B 25/00
[52] U.S. Cl. ....................................... 434/94
[58] Field of Search ............... 132/1 R, 53; 434/94, 434/155, 219

[56] References Cited

U.S. PATENT DOCUMENTS

| | | | |
|---|---|---|---|
| 289,957 | 12/1883 | Baxter | 132/53 X |
| 994,619 | 6/1911 | Taylor | 132/53 |
| 2,071,338 | 2/1937 | Henze et al. | |
| 2,529,149 | 11/1950 | Fred | 132/45 R |
| 2,808,840 | 10/1957 | Santis | 132/45 R |
| 2,936,767 | 5/1960 | McDonough | 132/45 R |
| 2,975,534 | 3/1961 | Lutz | |
| 3,325,917 | 6/1967 | Kinnaman | 434/94 |
| 3,458,943 | 8/1969 | Trowbridge | 434/94 |
| 4,206,773 | 6/1980 | Deherrera | |
| 4,299,242 | 11/1981 | Choe | 132/53 |
| 4,317,462 | 3/1982 | Steiner | 434/94 X |
| 4,370,137 | 1/1983 | Herzig | 434/94 |
| 4,403,962 | 9/1983 | La Vista | 434/94 |

FOREIGN PATENT DOCUMENTS 2085724 5/1982 United Kingdom .

*Primary Examiner*—William H. Grieb
*Attorney, Agent, or Firm*—Wenderoth, Lind & Ponack

[57] ABSTRACT

An aid for use in instruction within the hairdresser profession includes a template-like piece of plate or sheet material on which there is drawn a head shape seen from the front, from the rear or in profile, i.e. right and left profile. Hair in the form of one or more hair tresses is glued or adapted to be attached with at a root portion thereof along a line on the head shape. The sheet material may be in the format A4 and preferably is transparent.

12 Claims, 12 Drawing Figures

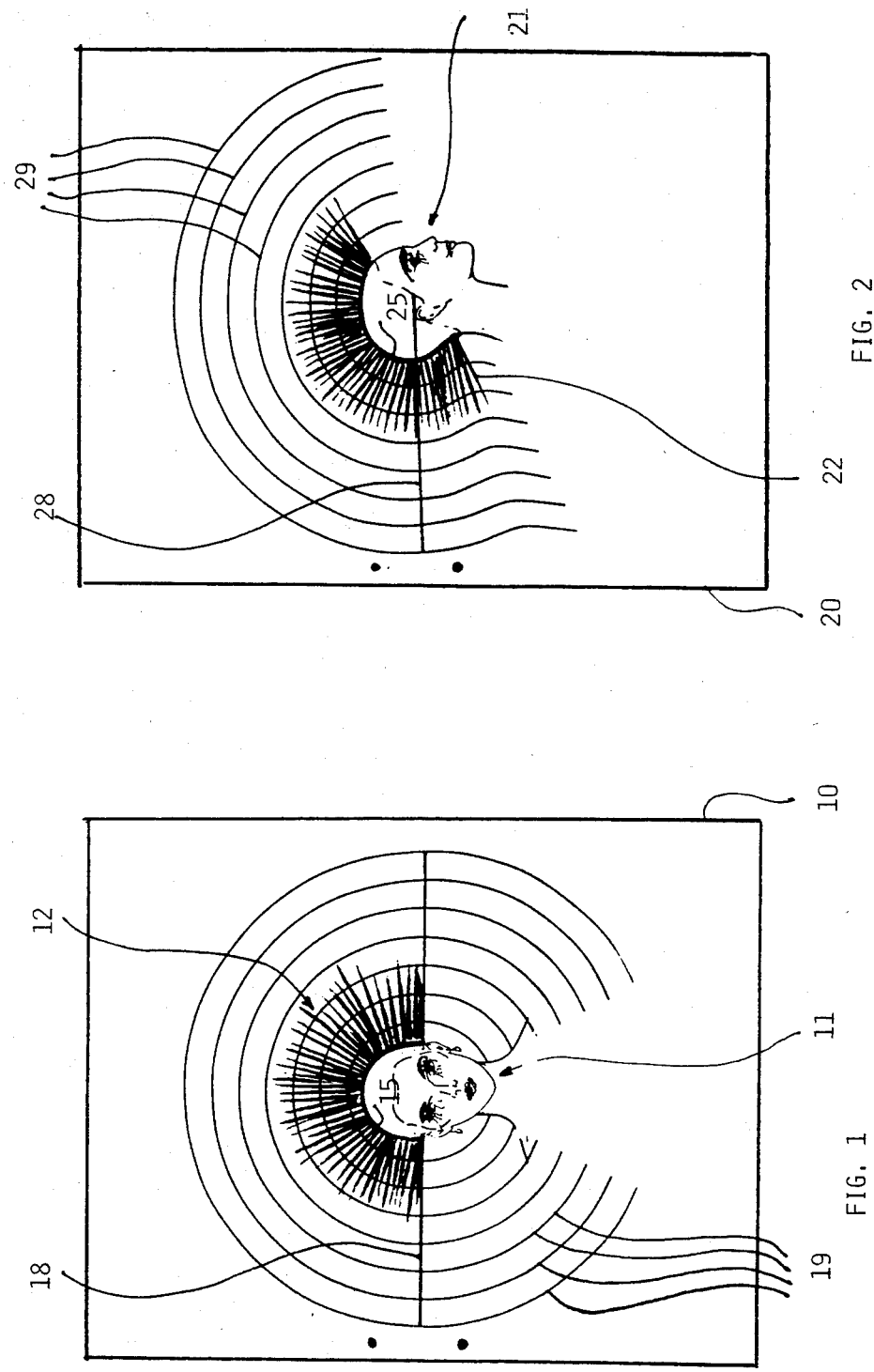

AID FOR USE IN INSTRUCTION WITHIN THE HAIRDRESSER PROFESSION

BACKGROUND OF THE INVENTION

More than in many other professions, educational instructions within the hairdresser profession involve significant problems associated with learning and practical exercises, inter alia, because hitherto there have to a large extent been employed test persons having suitable hair for demonstration of the various techniques and methods. Moreover, there have been used model scalps or coated heads which, however, are comparatively expensive and bulky. Therefore, these do not lend themselves to storage in order to show earlier works or demonstrations therewith. This in particular applies to cutting demonstrations. For the above reasons it is not possible at a highschool to possess a sufficient number of the known model scalps to be able to show the various cutting styles or shapes. Another drawback therewith is that the model scalps are heavy to transport and cumbersome to store.

There have been set forth proposals for methods or aids which in part seek to satisfy the same need as the present invention, for example an inflateable pattern head as described in U.S. Pat. No. 2,975,534 or a system of marked adhesive tabs or paper sheets as described in Published British Patent Application No. 2,077,097. However, none of these earlier proposals have been able to make possible the form of instruction and demonstration which is associated with the present invention, and, besides, have the drawback of being comparatively complicated in practical use.

SUMMARY OF THE INVENTION

The present invention should, inter alia, be considered in the light of the cutting terminology or so-called hair sculpturing which has been applied within the hairdresser profession during recent years. By means of this invention it is possible in a simple manner to explain and demonstrate these new methods and concepts to hairdresser pupils.

This is made possible with an aid to be used in education within the hairdresser profession.

With the aid according to the invention an instructor in a class room or a conference hall or the like may cut many different hair styles, and afterwards the pupils themselves may do exercises with the same aids and thereby obtain the necessary confidence. Further, the invention permits the display of various objects in the form of cutting shapes, etc. by means of an overhead projector, as movable hair which is incorporated in the aid, may be manipulated in various directions and angles. Therefore, it will not be difficult for the pupils to evaluate the cutting being demonstrated.

The advanced cutting system being introduced during recent years in connection with the above new terminology makes it possible to carry out cutting very systematically. By means of the present invention this form of cutting may be learned and practiced in a much better way than with the previously known educational aids. The present aid makes it possible to cut many different styles in an educational situation and thereby obtain good technique and confidence without incurring high expenses with respect to equipment and aids. The works or exercises made and being finished, may be stored in a simple manner because they take little space. After cutting it is also possible to perform colour changes and texture conversion and obtain a complete hair style if this is desired, by means of the aid according to the invention.

Additional advantages obtained with the invention include good understanding on part of the pupils and easy checking of learning.

BRIEF DESCRIPTION OF THE DRAWINGS

The invention shall be explained more closely below with reference to the accompanying drawings, in which:

FIGS. 1, 2 and 3 are schematic views showing three embodiments of the aid according to the invention.

DETAILED DESCRIPTION OF THE INVENTION

Figure 10:
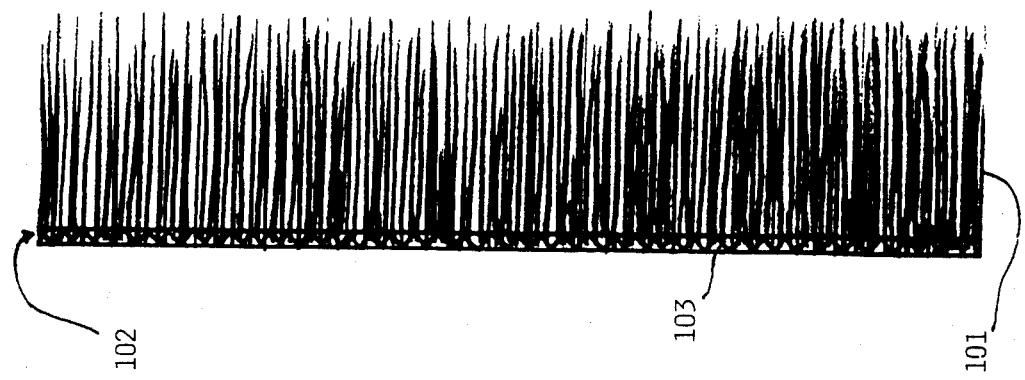
FIG. 10 is a view of an example of a hair tress or tuft for use in connection with this invention.

The aid in FIG. 1 comprises a sheet 10 of a plate shaped material, for example paper or paperboard, which may for example have a standard format, such as A4. Centrally on the sheet or plate 10 there is a picture of a head shape 11, here seen from the front. At increasing distances from the head contours of the head 11 there are drawn distance curves 19 which run parallel to each other and preferably have the same spacing. Further, there is shown a horizontal line 18 running transversally to the head shape 11 at a predetermined level for example just above the ears.

On the head shape 11 there is indicated a line or contour 15 which runs substantially from one ear to the other across the crown part of the head. Along this line 15 there is glued one or more hair tresses 12 such that these are attached at their root portion to the line or contour 15 around the head 11, the individual hairs which extend substantially in a radial direction from the head, being free and movable so that these may be shaped in various ways and be cut.

The hair tresses or tufts may be of a construction known per se and shall be described more fully in connection with FIG. 10 below.

As mentioned the sheet 10 may have the format A4 such that it may be easily handled and may for example be put into a ring leaf book. For use in an overhead projector the sheet 10 may be made of a transparent material, thus making it possible to show the head shape, the distance curves and the movable hair on a screen in order to for example demonstrate cutting methods to a school class or a larger audience.

FIG. 2 shows a sheet 20 which may be similar to the sheet 10 in FIG. 1, but here with a head shape 21 shown in profile. There are also shown distance curves 29 and a horizontal line 28 for angle indications. In FIG. 2 hair tresses 22 are attached along the contour line 25 from a forehead across the crown part to the neck part of the head shape shown.

Figure 3:
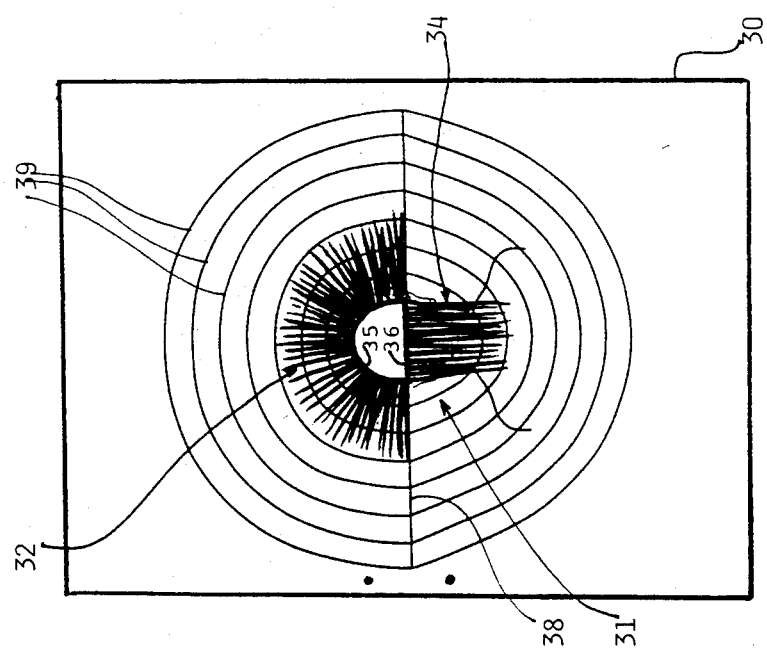

A head 31 is shown from the back on a sheet 30 illustrated on FIG. 3, in which there is, similar to the two preceding embodiments, drawn distance curves 39 and a horizontal line 38. These indications may per se be identical to the corresponding indications in FIG. 1. The same applies to hair tresses 32 which are attached along a line 35 extending substantially across the crown part of the head shape 31 from one ear to the other. Besides, there is shown another hair tress 34 with the hairs hanging down over the neck, this hair tress 34 being attached along a line 36 running across the back of the head substantially from one ear to the other.

Figure 5:
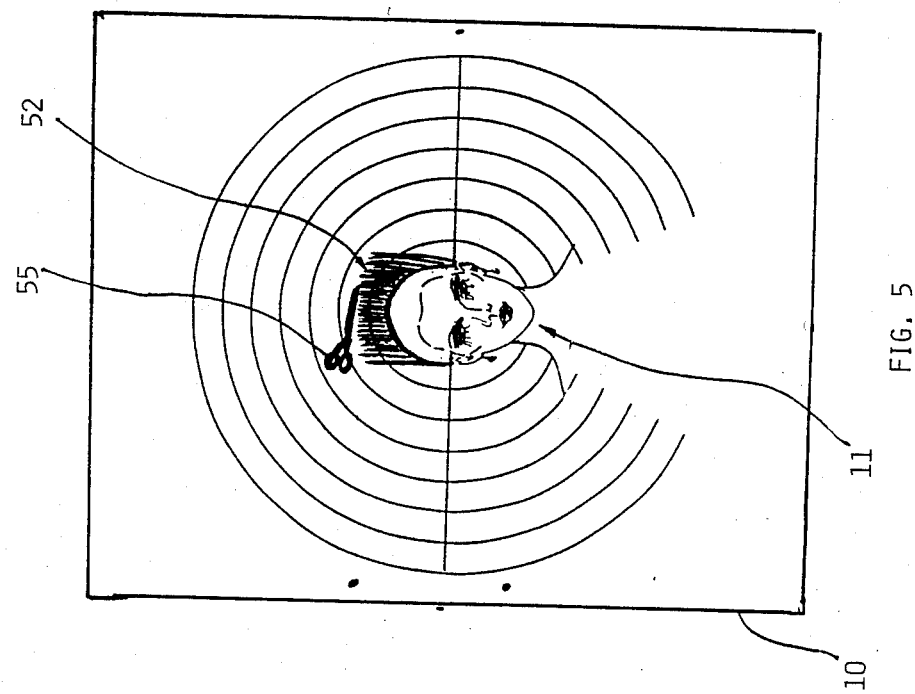
FIGS. 4 and 5 are schematic views showing examples of cutting possible by means of these aids.
Figure 4:
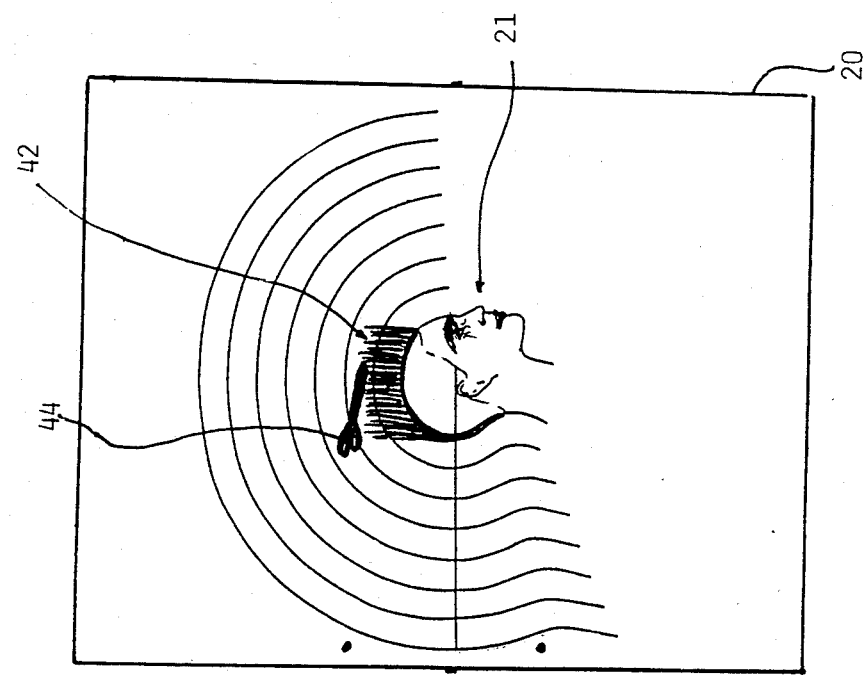

In FIG. 4 there is illustrated how the sheet 20 in FIG. 2 with associated shapes, indications and hair tresses, may be treated by cutting with scissors 44, whereby a certain hair style as indicated by 42 has been obtained. By means of a comb the hair in the hair tress 22 in FIG. 2 has been arranged to extend vertically upwards. In a similar way FIG. 5 shows styling and cutting with the aid in FIG. 1, in which the tress 12 is cut by means of scissors 55 and provided with a cut indicated as 52.

Figure 6:
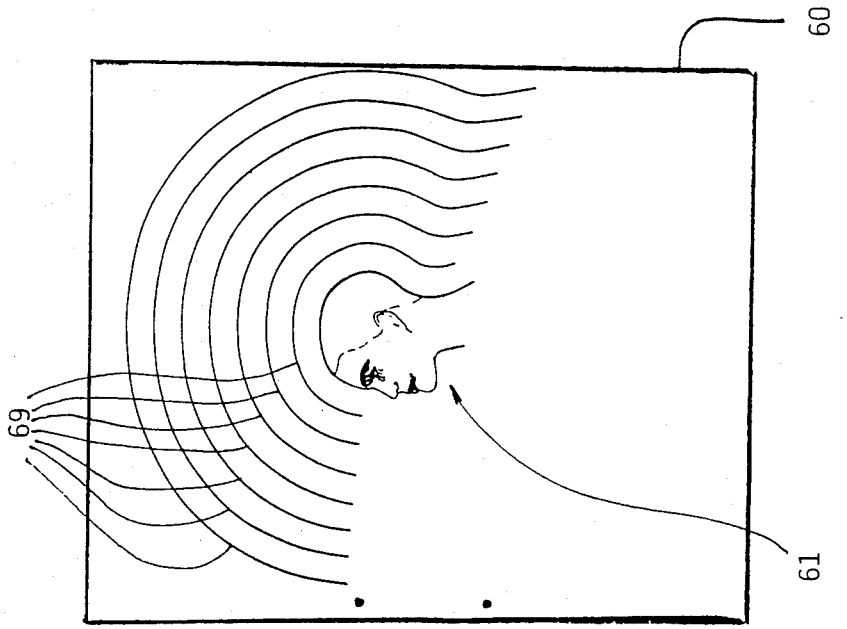
FIG. 6 is a schematic view showing a simplified embodiment according to the invention.

In the above embodiments the hair tresses have been glued to the various sheets beforehand, i.e. from the producer. It is, however, easily conceivable that this aid may be supplied in its separate constituents, i.e. the sheet itself with drawings and indications, as well as the per se known hair tresses separately. In many situations this will be an advantage because the users, for example the hair dresser instructors or the pupils themselves, may combine different hair types or colours with the various sheets or head shapes. Thus, FIG. 6 shows a sheet 60 having a head shape 61 without any hair attached, and also distance curves 69 similar to those discussed above. On the head shape 61 there is not applied any particular marking or line indication for attaching hair tresses, but it is obvious that in this embodiment as well as in the preceding embodiments, a primary and natural attachment of hair tresses will be along the contour line from the forehead across the crown part to the neck part of the this head shape. Other curves or lines for attachment of hair tresses can of course be freely chosen.

Figure 7:
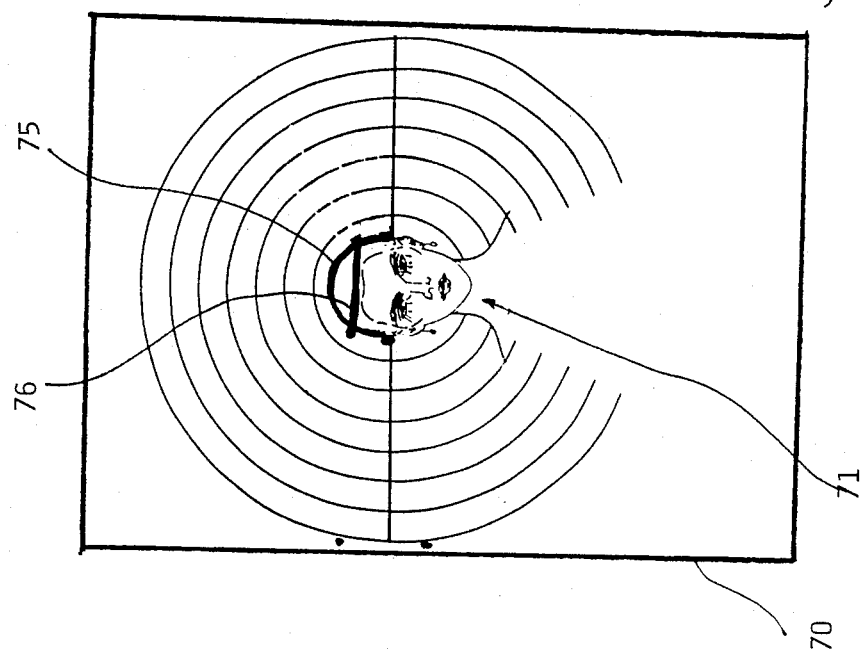
FIGS. 7, 8 and 9 are schematic views showing additional embodiments according to the invention.
Figure 9:
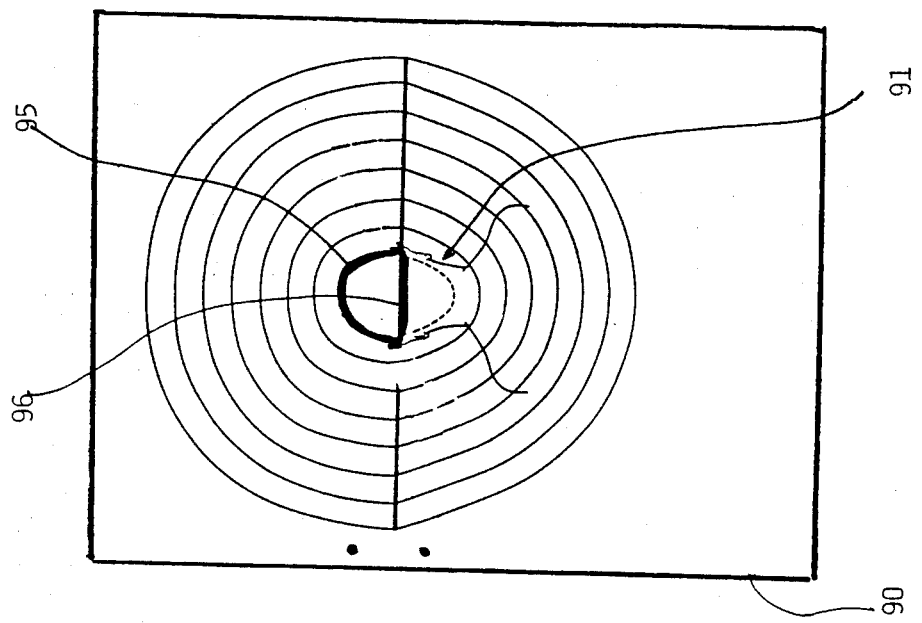
Figure 8:
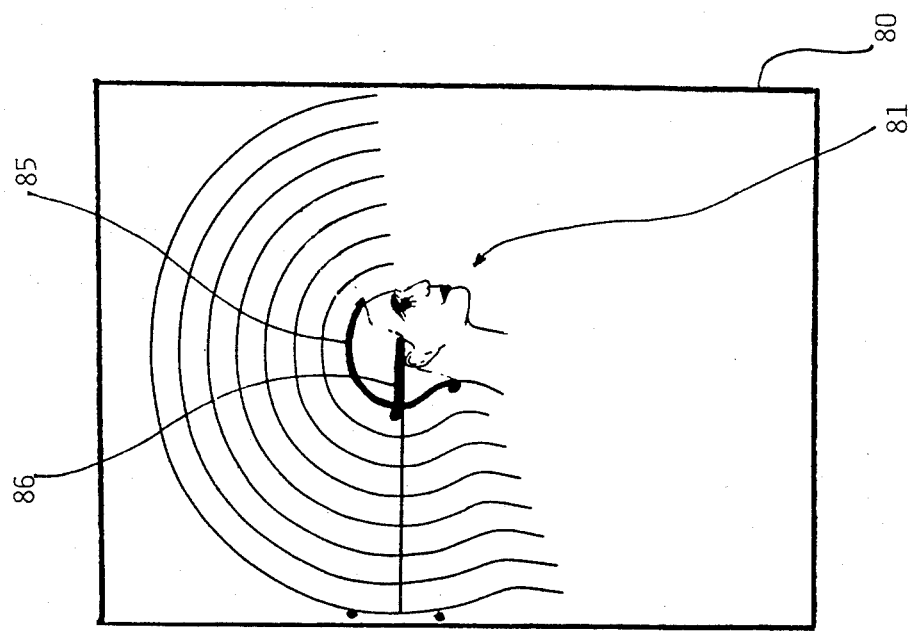

When using sheets or head shapes without pre-attached hair there will usually be a great advantage if it is clearly indicated which lines of interest are present for attaching hair. Thus, FIG. 7 shows a sheet 70 having a head shape 71 seen from the front and provided with a line indication 75 from one ear to the other across the crown part and also a transverse line 76 across the forehead. FIG. 8 shows a similar head shape 81 on a sheet 80 seen in profile and having a line or indication 85 from the forehead across the crown part to the neck and another line 86 from the back of the head substantially horizontally forwards and past the ear as far forward as there is normally growth of hair. Finally FIG. 9 shows in a corresponding manner on a sheet 90 a head shape 91 seen from the back, having an indication 95 from one ear to the other across the crown part and a transverse line 96 on the back of the head, also substantially from one ear to the other. It is obvious that with these sheets provided with such drawings or indications, for example by means of printing, it is a simple operation for the users to attach hair tresses as desired along the various lines, preferably by means of an adhesive, for example contact glue.

FIG. 10 shows an example of a hair tress or tuft of known design, which may be incorporated in the aid according to the invention. This hair tress consists of an assembly of hairs 101 being here shown as extending substantially parallel or depending from a root portion 102 at which the hair ends are anchored by means of stitching, for example a zigzag seam 103 as indicated. For example by means of contact glue it is a simple operation to attach such hair tresses at the root portion 102 to a sheet of paper or the like, as for example sheets 70, 80 or 90 in FIGS. 7 to 9.

Figure 11:
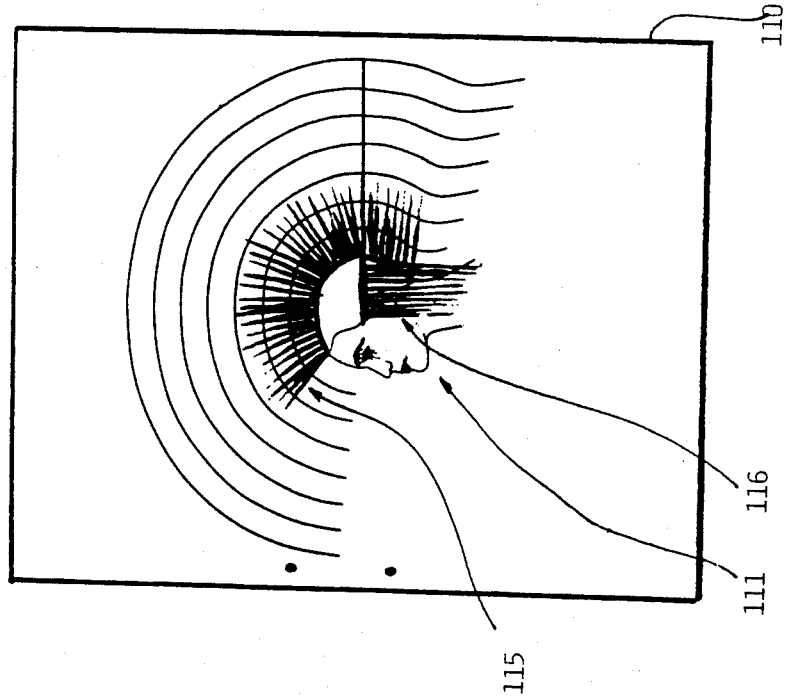

It is obvious that the hair tresses which lend themselves for use in this connection, may have different lengths of the root part 102 and of the actual hair assembly 101. For use on sheets of the format A4 the hair length may for example be from 10 to 15 cm. FIG. 11 shows a finished aid having hair tresses 115 and 116 glued to a head shape 111 printed on a sheet or transparency 110, the head shape 111 being shown in profile in a manner similar to the head shape 81 in FIG. 8 and from the opposite side in relation thereto.

Figure 12:
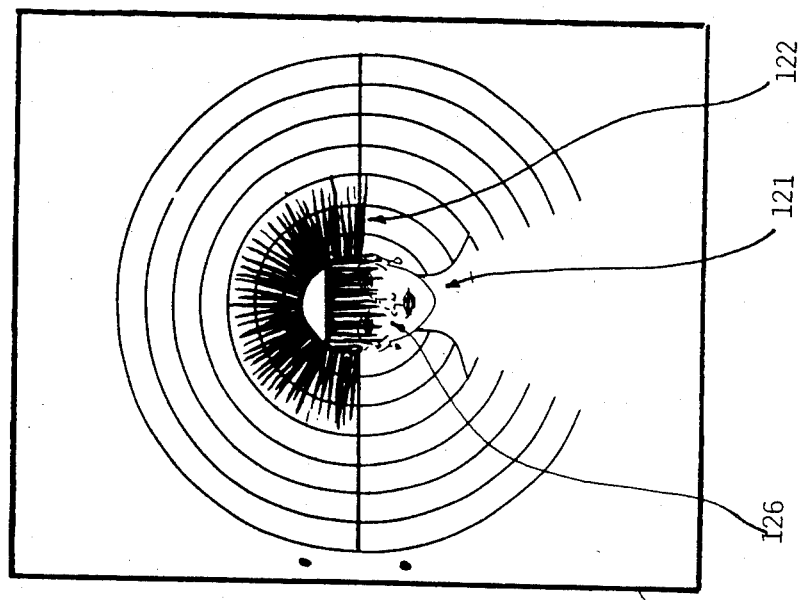
FIGS. 11 and 12 are schematic views showing two additional embodiments of the aid according to the invention.

Finally, FIG. 12 shows a sheet 120 with a head shape 121 provided with hair tresses 122 and 126. This complete aid may be considered to have resulted from the sheet 70 in FIG. 7 with the head shape 71 and indications or lines 75 and 76 being printed thereon. More specifically the tresses 122 may be regarded as glued to the head shape along the line 75 whereas the hair tress 126 follows the line 76.

In the above description there are shown head shapes seen from the front, from the back and in profile from one or the other side. These are the forms of presentation being most instructive and natural for teaching purposes, but it cannot be excluded that for particular situations or hair styles it may be of interest to use sheets having head shapes seen at other angles than those mentioned here. As known per se the hair tresses may advantageously consist of real or natural hair, but is of course also possible to use hair tresses made of artificial hair. What is decisive is that the hair in the hair tresses may be shaped or arranged on the sheets in various patterns or shapes, inter alia by means of a comb, and besides may be cut by means of common hairdresser's scissors. A practical manner of producing and supplying this product is that aids in the form of a set consisting of four sheets with head shapes shown from the front, from the rear, in right profile and left profile together with an accompanying assortment of hair tresses, are supplied together as a set or a package, possibly also including the necessary glue. As will be apparent from the above, it is best in practice to have only one head shape on each sheet or transparency. As indicated in the left margin of the sheets shown, it is practical that these have a usual form of perforation intended for mounting in standard ring leaf books.

I claim:

1. An instruction aid for demonstration and practice of hairdressing techniques, said aid comprising:
   a plate or sheet shaped member having formed thereon a head shape as seen from one of a front view, a back view or a profile view;
   at least one hair tress including a root portion and a multiplicity of hairs fixed to and extending from said root portion;
   said hair tress being attached at said root portion thereof to said member such that said root portion extends along a line at a predetermined position with respect to said head shape and said hairs extend from said root portion in simulation of hair of a person seen from said one view; and
   said hairs having sufficient length to enable the application thereto of hairdressing treatments such as cutting by scissors.

2. An aid as claimed in claim 1, wherein said head shape is seen from the back, and said line extends along the contour of the crown portion of said head shape substantially from one ear to the other, and further comprising another line extending transversally across the rear of the head shape substantially from one ear to the other.

3. An aid as claimed in claim 1, wherein said head shape is seen in profile, and said line extends along the contour of the crown portion of said head shape substantially from the forehead to the neck, and further comprising another line extending from the neck portion forwardly to above the ear.

4. An aid as claimed in claim 1, further comprising parallel curved lines formed on said member at spaced distances from the contour of said head shape.

5. An aid as claimed in claim 1, wherein said member is transparent.

6. An aid as claimed in claim 1, wherein said hair tress is attached to said member by means of an adhesive.

7. An instruction aid for demonstration and practice of hairdressing techniques, said aid comprising:
   a plate or sheet shaped member having formed thereon a head shape as seen from one of a front view, a back view or a profile view;
   at least one hair tress including a root portion and a multiplicity of hairs fixed to and extending from said root portion;
   said member having formed thereon a line at a predetermined position with respect to said head shape, and said hair tress being adapted to be attached at said root portion thereof to said member such that said root member extends along said line and said hairs extend from said root portion in simulation of hair of a person seen from said one view; and
   said hairs having sufficient length to enable the application thereto of hairdressing treatments such as cutting by scissors.

8. An aid as claimed in claim 7, wherein said head shape is seen from the back, and said line extends along the contour of the crown portion of said head shape substantially from one ear to the other, and further comprising another line extending transversally across the rear of the head shape substantially from one ear to the other.

9. An aid as claimed in claim 7, wherein said head shape is seen in profile, and said line extends along the contour of the crown portion of said head shape substantially from the forehead to the neck, and further comprising another line extending from the neck portion forwardly to the above the ear.

10. An aid as claimed in claim 7, further comprising parallel curved lines formed on said member at spaced distances from the contour of said head shape.

11. An aid as claimed in claim 7, wherein said member is transparent.

12. An aid as claimed in claim 7, further comprising adhesive for attaching said root portion to said member.

* * * * *